United States Patent
Davydenko et al.

(10) Patent No.: US 12,372,622 B2
(45) Date of Patent: Jul. 29, 2025

(54) APPARATUS AND METHOD FOR SCANNING ASCERTAINMENT OF THE DISTANCE TO AN OBJECT

(71) Applicant: Carl Zeiss AG, Oberkochen (DE)

(72) Inventors: Vladimir Davydenko, Bad Herrenalb (DE); Peter Westphal, Jena (DE)

(73) Assignee: Carl Zeiss AG, Oberkochen (DE)

( * ) Notice: Subject to any disclaimer, the term of this patent is extended or adjusted under 35 U.S.C. 154(b) by 1163 days.

(21) Appl. No.: 17/211,401

(22) Filed: Mar. 24, 2021

(65) Prior Publication Data
US 2021/0231778 A1  Jul. 29, 2021

Related U.S. Application Data

(63) Continuation of application No. PCT/EP2019/074879, filed on Sep. 17, 2019.

(30) Foreign Application Priority Data

Sep. 27, 2018 (DE) .............. 10 2018 216 632.3
Jul. 5, 2019 (DE) .............. 10 2019 209 933.5

(51) Int. Cl.
  *G01S 7/48* (2006.01)
  *G01S 7/481* (2006.01)
  *G01S 17/42* (2006.01)

(52) U.S. Cl.
  CPC .......... *G01S 7/4815* (2013.01); *G01S 7/4817* (2013.01); *G01S 17/42* (2013.01)

(58) Field of Classification Search
  None
  See application file for complete search history.

(56) References Cited

U.S. PATENT DOCUMENTS

| | | |
|---|---|---|
| 2010/0191418 A1* | 7/2010 | Mimeault ............. G01S 17/931 356/4.01 |
| 2014/0233013 A1 | 8/2014 | Sakimura et al. |
| 2016/0299228 A1 | 10/2016 | Maleki et al. |
| 2017/0090031 A1 | 3/2017 | Bondy et al. |

(Continued)

FOREIGN PATENT DOCUMENTS

WO  WO 2009064934 A2  5/2009

OTHER PUBLICATIONS

Carl Zeiss AG, International Search Report, PCT/EP2019/074879, Jan. 17, 2020, 16 pgs.

(Continued)

*Primary Examiner* — Hovhannes Baghdasaryan
(74) *Attorney, Agent, or Firm* — Morgan, Lewis & Bockius LLP

(57) ABSTRACT

An apparatus and method for scanning ascertainment of a distance to an object are disclosed. Lasers of a light source emit a plurality of optical signals each having a time-varying frequency. At a given time, the frequencies of the optical signals are different. An evaluation device ascertains the distance to the object on the basis of measurement optical signals that were emitted by the light source and reflected or scattered at the object, and of reference optical signals that were emitted by the light source and were not reflected or scattered at the object. A dispersive scanning device simultaneously deflects the optical signals in different frequency-dependent directions.

12 Claims, 15 Drawing Sheets

(56) References Cited

U.S. PATENT DOCUMENTS

2018/0024246 A1  1/2018  Jeong et al.
2018/0031680 A1  2/2018  Lee et al.

OTHER PUBLICATIONS

German Office Action, German Application No. DE 102018216632.3, Jul. 10, 2019, 10 pgs.
Coldren, Tunable Semiconductor Lasers: A Tutorial, Journal of Lightwave Technology, vol. 22 No. 1, Jan. 2004, 10 pgs.
Goda, Hybrid Dispersion Laser Scanner, Scientific Reports, Jun. 8, 2012, 8 pgs.
Van Acoleyen, Two-Dimensional Dispersive Off Chip Beam Scanner Fabricated on Silicon-On-Insulator, IEEE Photonics Technology Letters, vol. 23, No. 17, Sep. 1, 2011, 4 pgs.
Carl Zeiss AG, EP19779764.0, Office Action, Nov. 2, 2022, 13 pgs.

\* cited by examiner

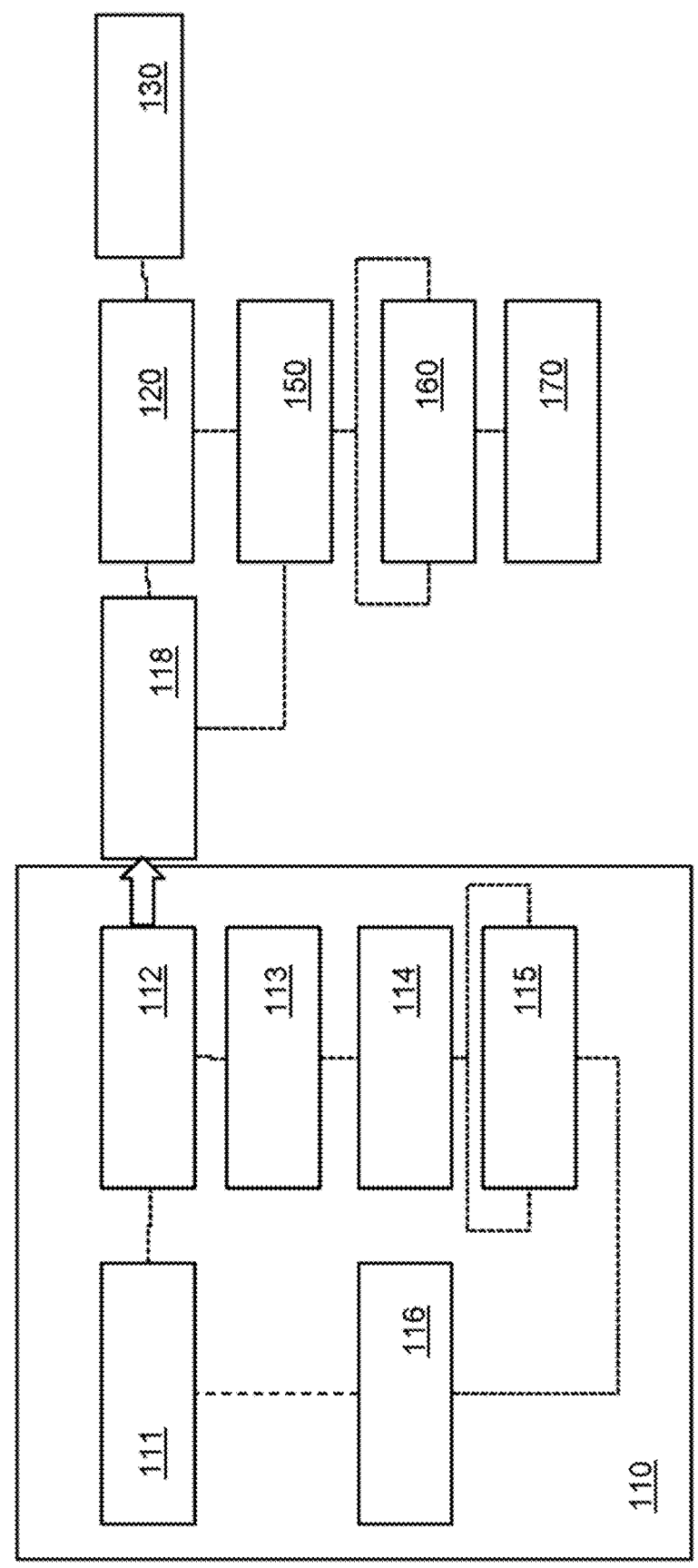

a)

b)

c)

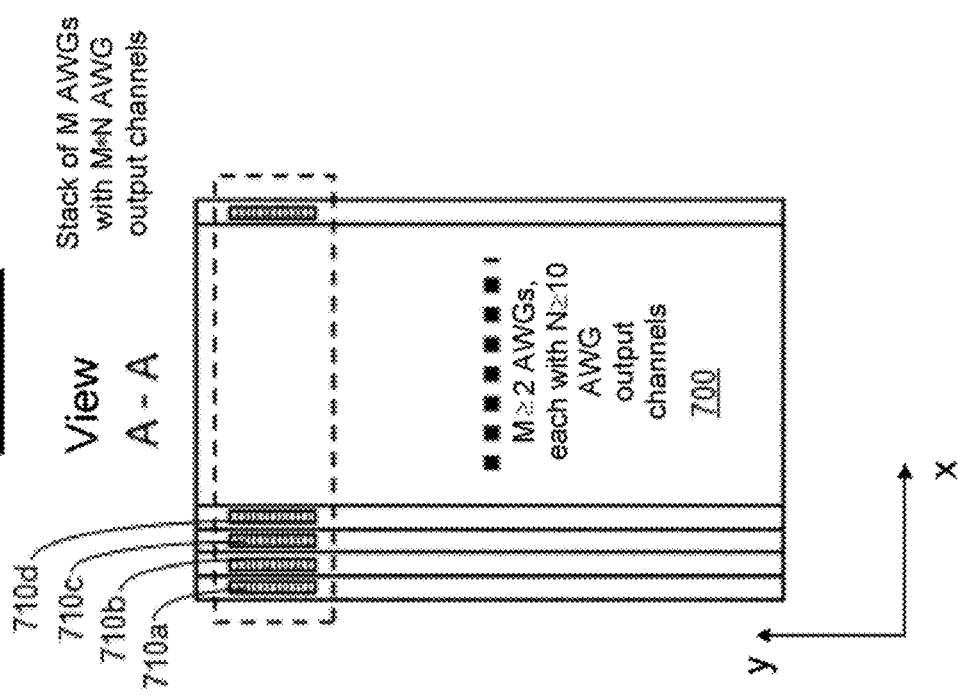
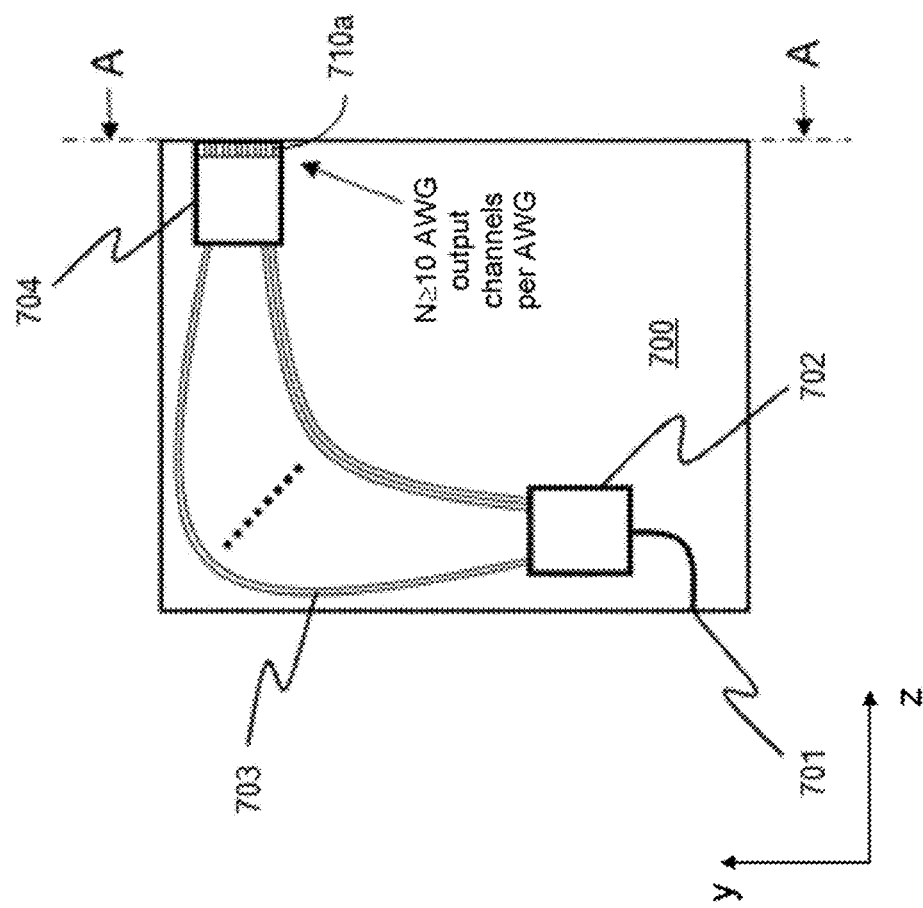

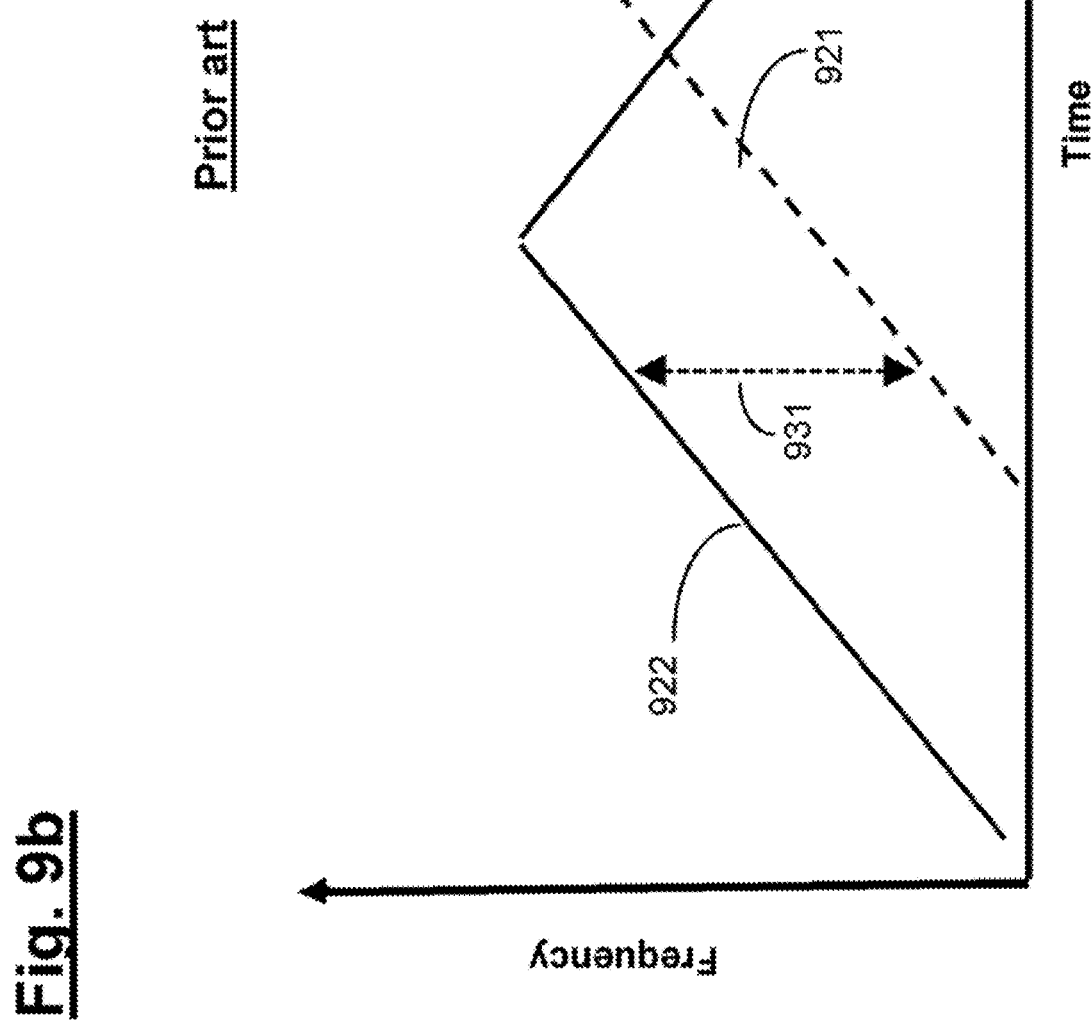

APPARATUS AND METHOD FOR SCANNING ASCERTAINMENT OF THE DISTANCE TO AN OBJECT

CROSS-REFERENCE TO RELATED APPLICATIONS

The present application is a continuation application of International Application No. PCT/EP2019/074879, filed Sep. 17, 2019, which claims priority to German patent application no. 10 2018 216 632.3, filed Sep. 27, 2018 and German patent application no. 10 2019 209 933.5, filed Jul. 5, 2019. Each of these applications is incorporated by reference herein in its entirety.

BACKGROUND OF THE INVENTION

Field of the Invention

The invention relates to an apparatus and a method for scanning ascertainment of a distance to an object. The apparatus and the method can be used to ascertain distances to both moving and stationary objects and, in particular, to ascertain the topography or form of a spatially extended three-dimensional object.

Prior Art

For the purposes of measuring the distance to objects by optical means, a measurement principle also referred to as LIDAR is known, amongst others, in which an optical signal whose frequency changes in time is emitted to the relevant object and evaluated after back-reflection has taken place at the object.

FIG. 9a shows, merely in a schematic illustration, a basic structure, known per se, in which a signal 911 with a time-varying frequency (also referred to as "chirp"), emitted by a light source 910, is split into two partial signals, this split being implemented, for example, by way of a beam splitter (e.g., a partly transmissive mirror or fiber-optic splitter) which is not illustrated here. The two partial signals are coupled by way of a signal coupler 950 and superposed at a detector 960, with the first partial signal, as a reference signal 922, reaching the signal coupler 950 and the detector 960 without a reflection at the object denoted by "940". By contrast, the second partial signal arriving at the signal coupler 950 or at the detector 960, as a measurement signal 921, propagates to the object 940 via an optical circulator 920 and a scanner 930, is reflected back by said object and consequently arrives at the signal coupler 950 and the detector 960 with a time delay and a correspondingly altered frequency in comparison with the reference signal 922.

An evaluation device (not illustrated) is used to evaluate the detector signal supplied by the detector 960 relative to the measuring apparatus or the light source 910, with the difference frequency 931 between the measurement signal 921 and reference signal 922, said difference frequency being captured at a certain time and illustrated in the diagram in FIG. 9b, being characteristic for the distance to the object 940 from the measuring apparatus or the light source 910. In accordance with FIG. 9b, in this case, in order to obtain additional information with regard to the relative speed between the object 940 and the measuring apparatus or the light source 910, the time-dependent frequency profile of the signal 911 emitted by the light source 910 can also be constituted such that there are two segments in which the time derivatives of the frequency generated by the light source 910 are opposite to one another.

In practice, there is a need to realize a distance measurement that is as accurate and reliable as possible even in the case of objects (possibly even moving objects), which could be, e.g., vehicles in traffic, that are spaced relatively far apart. In view of a reliability that is as high as possible and a service life that is as long as possible for the apparatus for ascertainment of a distance, it is desirable to avoid or minimize the use of movable components such as scanning or deflection mirrors within the scope of scanning the respective object.

In principle, the prior art has disclosed the realization of optical scanners on the basis of dispersion elements, with a two-dimensional beam deflection also being performable, in particular by combining an AWG ("array waveguide grating") with an additional grating.

In order to realize a dispersive scanning process in a LIDAR system without using movable components, the tuning range of the utilized light source should be as large as possible, e.g. in the order of 4 to 12 THz. A problem occurring in this case in practice is that DFB lasers (DFB laser="distributed feedback laser") which would be particularly suitable, in principle, as a light source in a LIDAR system on account of the good coherence properties only have a comparatively tightly delimited tuning range (of the order of 500 GHz), and so the realization of a scanning process that is sufficiently fast for applications in road traffic, for example, represents a significant challenge. This applies even more since the aforementioned generation of optical signals with opposing time-dependent frequency profiles as per FIG. 9b requires an increased measurement time.

In respect of the prior art, reference is made purely by way of example to US 2016/0299228 A1 and the following publications: K. Van Acoleyen et al.: "*Two-Dimensional Dispersive Off-Chip Beam Scanner Fabricated on Silicon-On-Insulator*", IEEE Photonics Technology Letters, Vol. 23, No. 17, Sep. 1, 2011, 1270-1272, DiLazaro et al.: "*Large-volume, low cost, high-precision FMCW tomography using stitched DFBs*", Optics Express, Vol. 26, No. 3, Feb. 5, 2018, 2891-2904 and Coldren et al.: "*Tunable Semiconductor Lasers: A Tutorial*", Journal of Lightwave Technology, Vol. 22, No. 1, January 2004, 193-202.

SUMMARY OF THE INVENTION

Against the aforementioned background, it is an object of the present invention to provide an apparatus and a method for scanning ascertainment of a distance to an object, which facilitate a distance measurement that is as accurate, reliable and fast as possible even for an object located at a comparatively large distance (e.g., of several 100 m).

This object is achieved by the features of the independent patent claims.

An apparatus according to the invention for scanning ascertainment of a distance to an object comprises:
- a light source unit for emitting a plurality of optical signals that each have a time-varying frequency, the light source unit having a plurality of lasers;
- an evaluation device for ascertaining a distance to the object on the basis of measurement signals that were reflected or scattered at the object and each emerged from the optical signals and reference signals that were not reflected or scattered at the object; and
- a dispersive scanning device which brings about a frequency-selective deflection of the measurement signals that are steered to the object.

In embodiments of the invention, the lasers of the light source unit are DFB lasers ("distributed feedback laser"), DBR lasers (DBR="distributed Bragg reflector"), FDML lasers (FDML="Fourier-domain mode-locked"), WGMR lasers (WGMR="whispering gallery mode resonator") or surface-emitting lasers (VCSELs="vertical-cavity surface-emitting lasers").

In embodiments of the invention, the lasers of the light source unit differ from one another in respect of the mid frequencies in the time-dependent frequency profile of the respectively generated optical signal. In particular, in respect of the mid frequencies in the time-dependent frequency profile, the lasers of the light source unit can have a frequency offset corresponding to the respective tuning range.

In particular, the invention is based on the idea of, in a LIDAR system, using a laser array (in particular a DFB laser array, DBR laser array, WGMR laser array or else a VCSEL laser array) as a light source in conjunction with a dispersive scanning device which brings about a frequency-selective deflection of the respective measurement signals to the object to be measured in respect of its distance. Here, the term "laser array" is intended to comprise an arrangement of at least two lasers.

As a result of a suitable offset of the mid frequencies of the individual lasers within the light source unit utilized according to the invention or within the laser array (wherein this offset can substantially correspond to the tuning range of the individual lasers, in particular), it is possible, as a result, to realize a correspondingly large tuning range (corresponding, e.g., to a frequency response of the order of 10 THz or more) and hence an effective scanning process, wherein use can be made at the same time of the high temporal coherence of the DFB lasers (relative to VCSEL lasers, for instance).

The lasers within the light source unit utilized according to the invention or within the laser array can be operated sequentially in embodiments of the invention, wherein only one of the lasers is active in each case and the respective next laser is only activated once the preceding laser has reached the limit of its tuning range.

The lasers of the light source unit can also be operated simultaneously in further embodiments of the invention, with the consequence that the respective measurement signals of all lasers are sent at the same time. Here, on the basis of the respective frequency range, there can be a spatial split by way of a further dispersive element of the measurement signals that were reflected by the object. Moreover, the detector arrangement can comprise a plurality of mutually independently operable detector elements which in turn are assigned to different angular regions in the angular distribution of the measurement signals that are steered to the object.

In embodiments of the invention, the dispersive scanning device used according to the invention for the frequency-selective deflection of the measurement signals that are steered to the object is configured as a two-dimensional dispersive scanning device and to this end can comprise, in particular, at least one AWG in combination with a diffraction grating. During the dispersive scanning process, the AWG present in the dispersive scanning device can operate at a higher order and can bring about a comparatively fast deflection in a first spatial direction, whereas the (output coupling) grating operated at a lower order brings about a comparatively slow deflection in the spatial direction perpendicular thereto.

According to one embodiment, a laser array formed by the light source unit has a resultant tuning range of at least 1 THz, more particularly of at least 4 THz, further particularly of at least 10 THz.

According to one embodiment, the lasers of the light source unit are designed to generate optical signals with a time-dependent frequency profile with two sections, the time derivative of the frequency in one section being opposite to that of the other, in each case for the purposes of obtaining additional information in respect of the relative speed between the object and the measuring apparatus or the light source unit.

According to one embodiment, the light source unit comprises a first laser for generating a first optical signal with a first time-dependent frequency profile and a second laser for generating a second optical signal with a second time-dependent frequency profile, with the time derivatives of the frequency in the first and second frequency profile being opposite to one another.

According to this aspect, the invention consequently contains the further idea of generating the optical signals which are usable for obtaining additional information in respect of the relative speed between the object and the measuring apparatus and which have temporally opposite frequency profiles by way of separate lasers, with the consequence that, in conjunction with a suitably configured dispersive scanning device and an appropriate synchronous operation of the two lasers, a significant measurement time reduction (substantially by a factor of two) can be achieved. In this case, the "suitably" configured dispersive scanning device means that—as will still be explained in more detail below—the dispersive scanning device, depending on whether the frequency ranges of the optical signals generated by the lasers are identical or different, the dispersive scanning device can have, e.g., two AWGs, only a single AWG or else a diffraction grating.

According to one embodiment, the frequency ranges traversed by the first optical signal and the second optical signal differ from one another.

According to one embodiment, the dispersive scanning device comprises at least one AWG.

According to one embodiment, measurement signals respectively emerging from the optical signals of the first and second laser, respectively, are coupled into the same AWG.

According to one embodiment, the dispersive scanning device comprises at least one diffraction grating.

According to one embodiment, measurement signals respectively emerging from the optical signals of the first and second laser, respectively, are coupled into the same diffraction grating.

According to one embodiment, the frequency ranges traversed by the first optical signal and the second optical signal coincide.

According to one embodiment, the dispersive scanning device comprises a first AWG and a second AWG.

According to one embodiment, the first optical signal is coupled into the first AWG and the second optical signal is coupled into the second AWG.

According to one embodiment, the first AWG and the second AWG are arranged next to one another in a direction perpendicular to the signal path.

According to one embodiment, a lateral distance between the first AWG and the second AWG has a value that is so small that, at the object (in the far field), the beams emanating from the AWGs have a lateral distance ranging from one to ten beam diameters. Expressed differently, there preferably is a lateral distance between the first AWG and the second AWG which, at the object, corresponds to a value ranging from one to ten beam diameters of a beam generated by the light source unit. What this achieves is that both AWGs are used to measure at approximately the same object location.

The invention further also relates to a method for scanning ascertainment of a distance to an object, the method including the following steps:
emitting at least one optical signal with a time-varying frequency using a light source unit; and
ascertaining a distance to the object on the basis of in each case a measurement signal that was reflected at the object and emerged from the at least one optical signal and a reference signal that was not reflected at the object;
wherein the measurement signals are steered in different beam directions to the object in frequency-selective fashion by way of a dispersive scanning device; and
wherein a plurality of measurement signals are simultaneously supplied to the dispersive scanning device, these measurement signals differing from one another in terms of their time-dependent frequency profile.

According to one embodiment, measurement signals simultaneously supplied to the dispersive scanning device respectively have a mutually opposite time-dependent frequency profile.

According to one embodiment, the method is carried out using an apparatus having the above-described features.

Further configurations of the invention can be gathered from the description and the dependent claims.

The invention is explained in greater detail below on the basis of exemplary embodiments illustrated in the accompanying figures.

BRIEF DESCRIPTION OF THE DRAWINGS

Further features and advantages of the invention will become apparent from the following description of exemplary embodiments with reference to the drawings, in which:
FIGS. 1a-1b show schematic illustrations for explaining the structure of an apparatus according to the invention in a first embodiment;
FIGS. 9a-9b show schematic illustrations for explaining structure and mode of operation of a conventional apparatus for ascertainment of a distance.

DETAILED DESCRIPTION OF PREFERRED EMBODIMENTS

Below, structure and functionality of an exemplary embodiment of an apparatus according to the invention are described with reference to the schematic illustration of FIGS. 1a-1b.

Figure 9A:
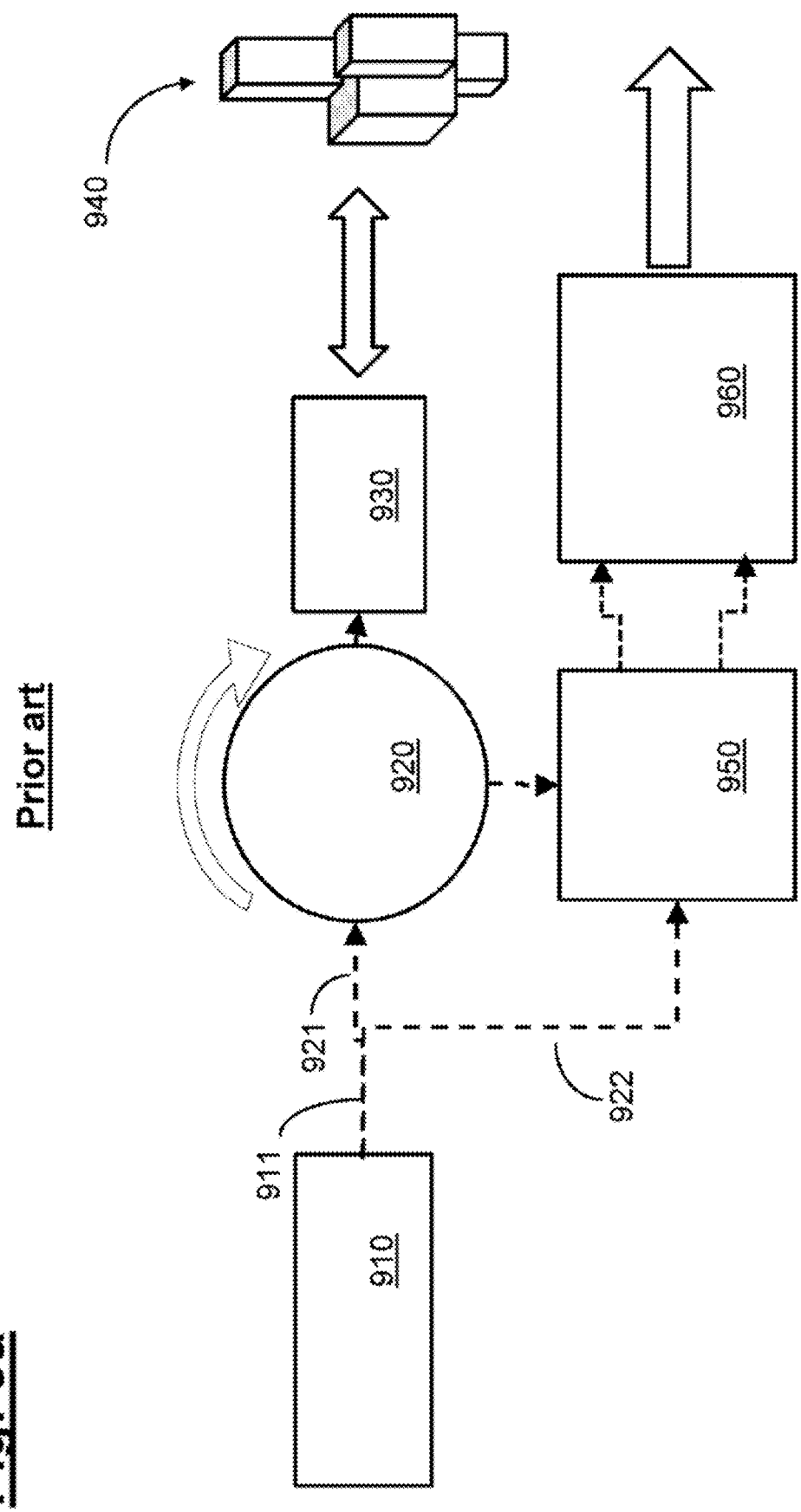

In accordance with FIG. 1a and in contrast to the conventional idea already described on the basis of FIGS. 9a-9b, as light source unit 110, use is not made of merely a single frequency-modulated FMCW laser (FMCW="frequency-modulated continuous wave") for the purposes of emitting an optical signal with a time-varying frequency ("chirp"), but instead use is made of a laser array 111 made of a plurality of lasers. The lasers can be DFB lasers or DBR lasers or else WGMR lasers or VCSEL lasers.

In respect of the basic functionality of a DFB laser array made of a plurality of DFB lasers, reference is made to DiLazaro et al.: "Large-volume, low cost, high-precision FMCW tomography using stitched DFBs", Optics Express, Vol. 26, No. 3, Feb. 5, 2018, 2891-2904, and Coldren et al.: "Tunable Semiconductor Lasers: A Tutorial", Journal of Lightwave Technology, Vol. 22, No. 1, January 2004, 193-202.

Figure 1B:
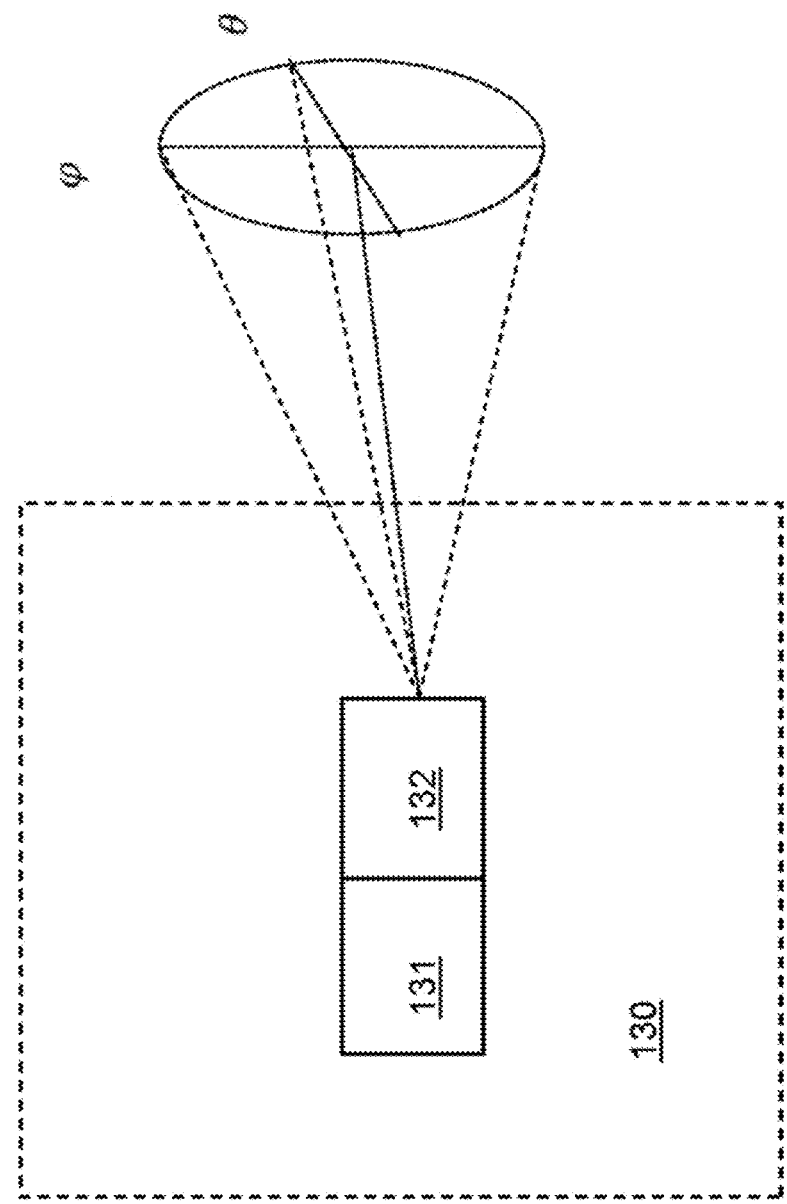

According to the invention, the use of this laser array 111 is combined with the use of a dispersive scanning device 130, the functionality of which is elucidated in FIG. 1b.

Figure 2:
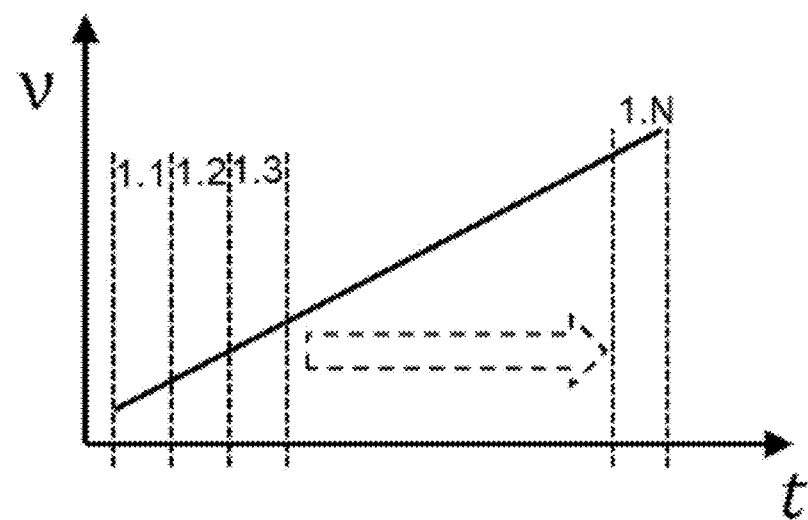
FIG. 2 shows diagrams for explaining the functionality of the apparatus according to the invention of FIGS. 1a-1b.
Figure 2:
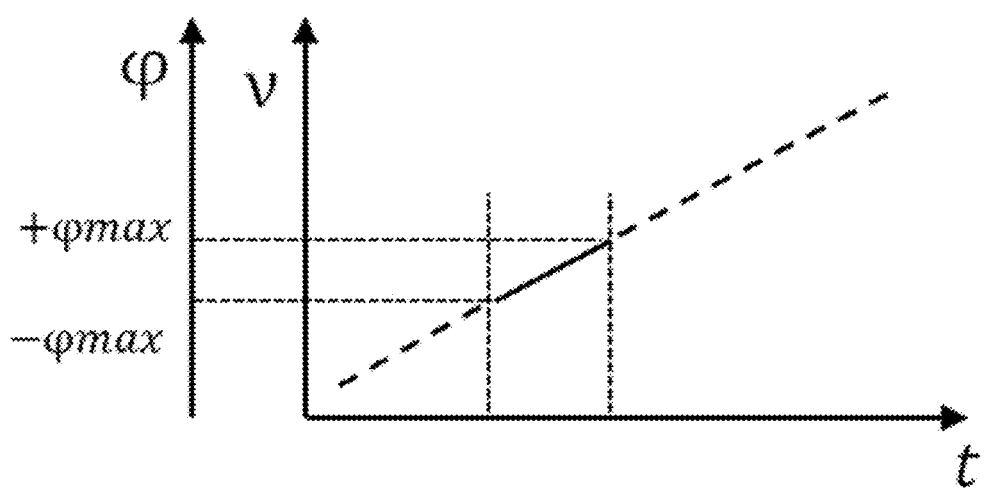
Figure 2:
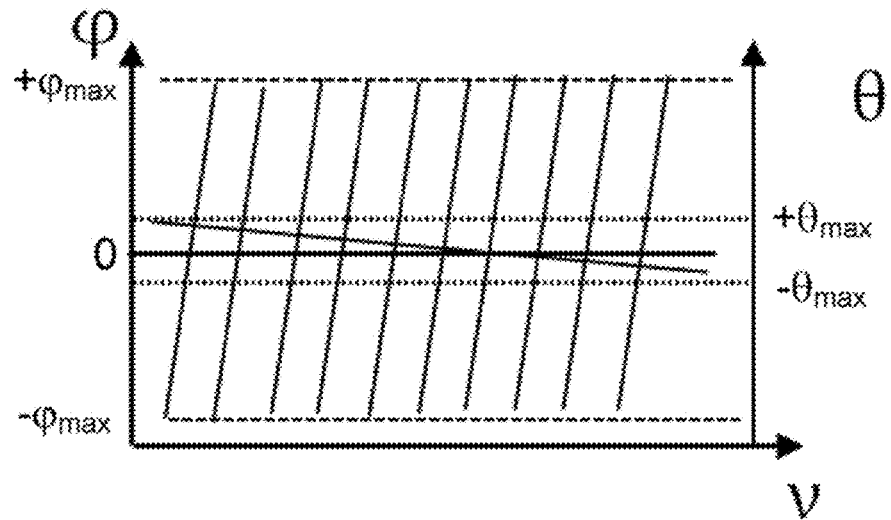

According to FIG. 1a, the laser array 111 used according to the invention is a constituent part of a light source unit 110 which, as a result, generates optical signals with in each case a time-varying frequency in accordance with the frequency response indicated in FIG. 2(a). A sequential operation of the individual lasers of the laser array 111 is implemented here—without the invention being restricted thereto. To this end, the light source unit 110 comprises a phase-locked loop for closed-loop control of the optical phase (OPLL="optical phase locked loop"), which, as per FIG. 1a, comprises a splitter 112, a Mach-Zehnder interferometer 113, serving as a frequency discriminator, with a downstream wavelength multiplexer (WDM="wavelength division multiplexer") 114, which may be configured as an AWG, for example, and a detector array 115, wherein the optionally amplified output signal of the detector array 115 forms the input for a control device 116, which comprises a power source and which serves to control the individual lasers of the laser array 111.

Figure 4:
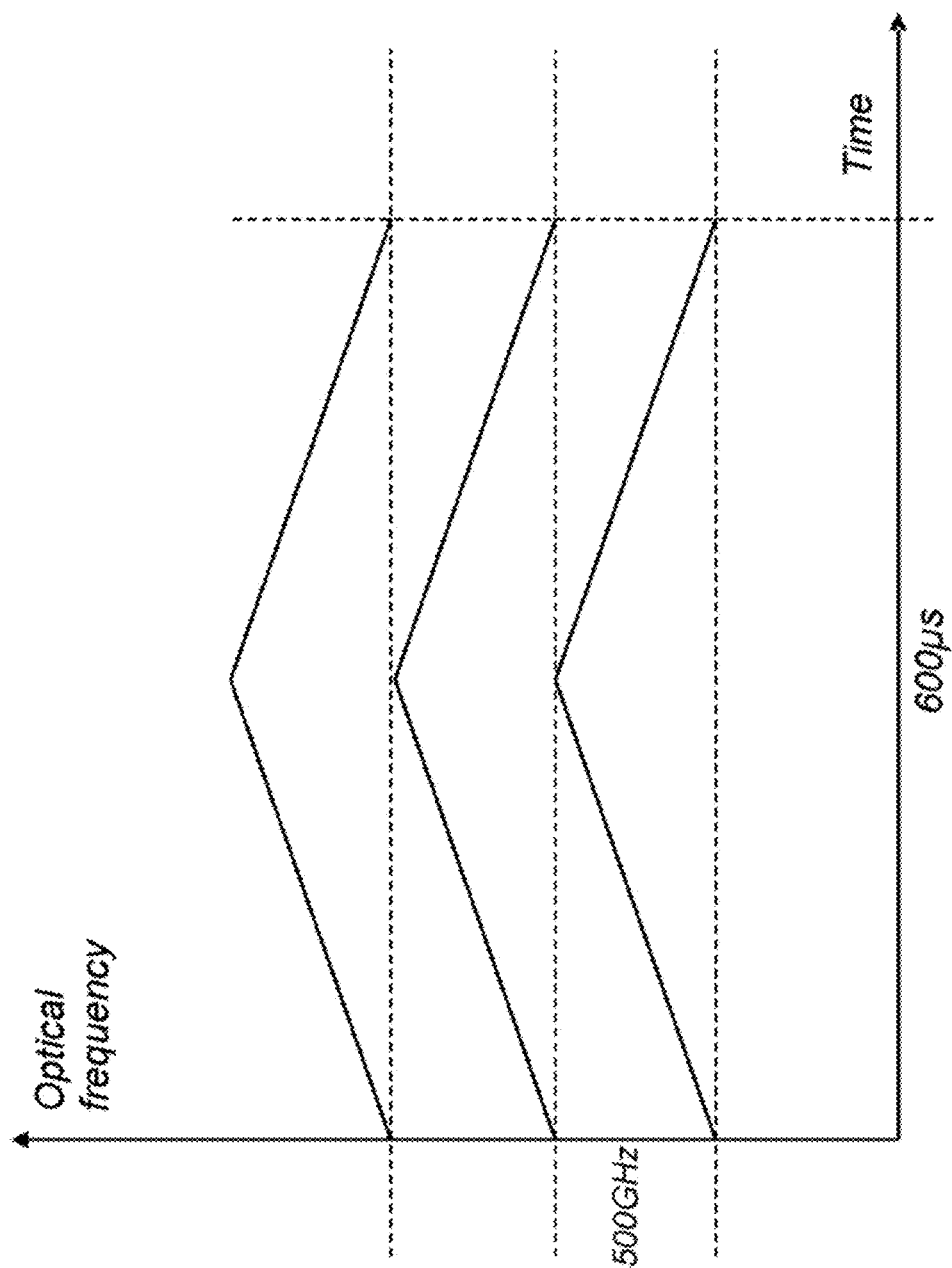

The individual lasers of the laser array 111 are offset from one another by approximately the tuning range in respect of their mid frequencies, with the consequence that the frequency response illustrated in FIG. 2(a) is generated in the case of sequential operation of the lasers of the laser array 111, with the contributions of the individual lasers being denoted by "1.1", "1.2", "1.3", . . . . In a further exemplary embodiment and in accordance with the diagram of FIG. 4, there can also be a simultaneous operation of the lasers of the laser array 111 if such sequential driving is dispensed with, and so the optical signals of the lasers are transmitted simultaneously in this case (but likewise with mid frequencies offset from one another in accordance with FIG. 4).

Referring to FIG. 1a again, the optical signals generated by the light source unit 110 are split in a manner known per se into partial signals serving as measurement signals and partial signals serving as a reference signal by a beam splitter 118 (e.g., a partly transmissive mirror or a fiber-optic splitter). The partial signals serving as a measurement signal are steered by an optical circulator 120 and the dispersive scanning device 130 onto an object (not illustrated in FIG. 1a) that is to be measured in respect of its distance from the apparatus, with the partial signals serving as a reference signal being used for the further evaluation in a manner analogous to FIGS. 9a-9b.

The dispersive scanning device 130 is configured in accordance with FIG. 1b as a two-dimensional scanning device and comprises an AWG 131 in combination with a diffraction grating 132 for the purposes of the frequency-selective deflection in two mutually perpendicular directions. In respect of the structure and functionality of a two-dimensional scanning device, known per se, reference is made to K. Van Acoleyen et al.: "Two-Dimensional Dispersive Off-Chip Beam Scanner Fabricated on Silicon-On-Insulator", IEEE Photonics Technology Letters, Vol. 23, No. 17, Sep. 1, 2011, 1270-1272.

According to the invention, the dispersion of the AWG 131 (which is defined by the order in which the AWG is operated) is chosen in the dispersive scanning device 130 to be substantially greater than the dispersion of the diffraction grating 132. As a consequence, there is a multiple scanning of the field of view (FoV="Field of View") by way of the AWG 131 along one spatial direction during the frequency tuning of the laser array 111 over the entire tuning range (of 12 THz, for example), but only a single instance of scanning the field of view along the spatial direction perpendicular thereto by way of the diffraction grating 132.

Consequently, in accordance with FIG. 2(b), the AWG 131 operated at a higher order brings about a comparatively fast scanning process, within the meaning of a frequency-selective deflection taking place over a comparatively short timescale through the angle (φ in a first spatial direction, whereas the diffraction grating 132 brings about a frequency-selective beam deflection in a spatial direction perpendicular thereto through the angle θ over a longer timescale in a comparatively slow scanning process.

Following the reflection at the object, the signal path extends back through the optical circulator 120 to a further dispersive element 150 (which may be designed as an AWG) for the frequency-selective spatial division of the measurement signal reflected by the object. On account of the frequency-selective spatial division by the further dispersive element 150, the different frequency regions which correspond to the different deflections toward the object are separated spatially from one another on a detector arrangement 160 that is configured as an array.

Figure 3:
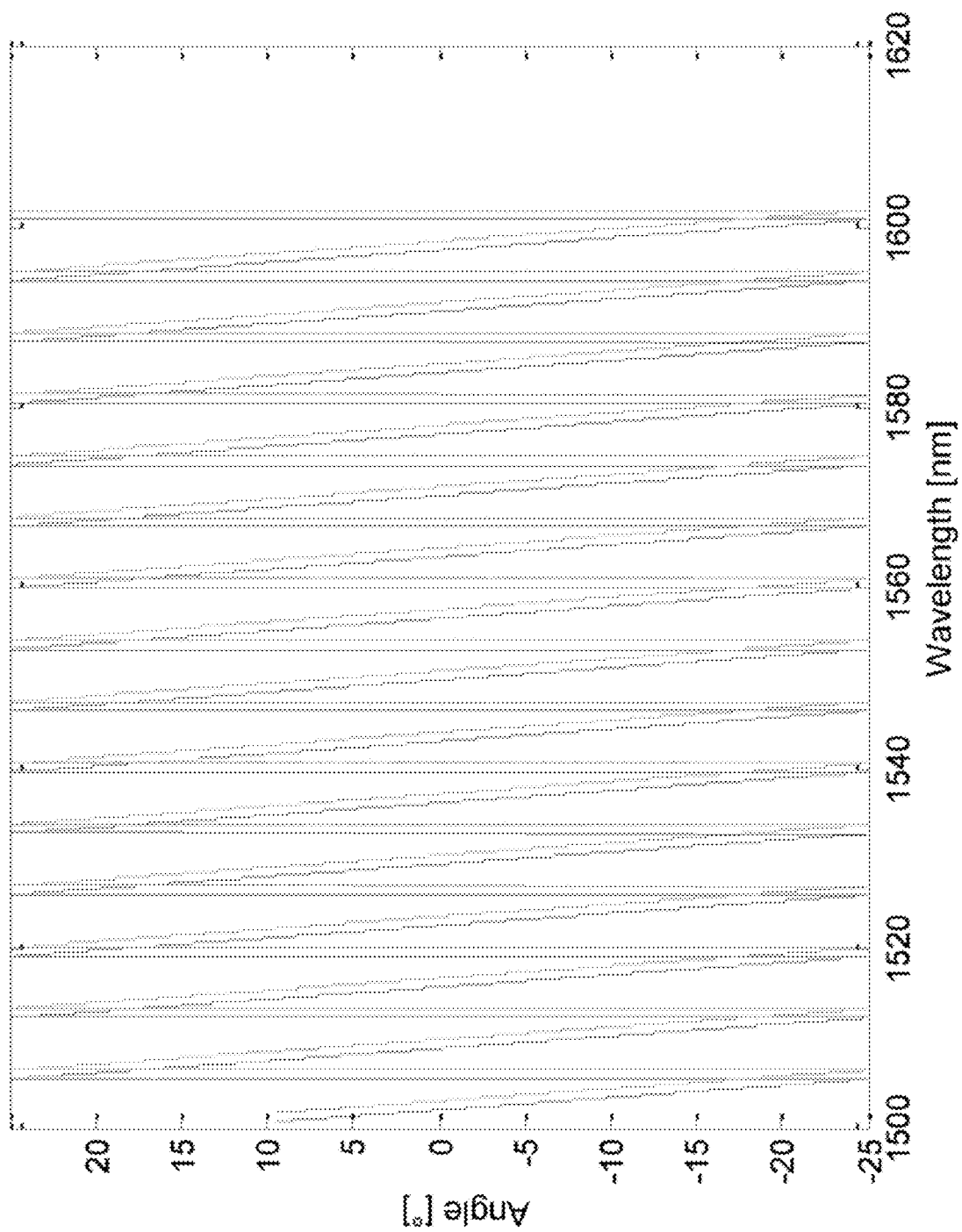
FIGS. 3-8c show diagrams for explaining further embodiments of an apparatus according to the invention.

The two-dimensional scanning process with a comparatively fast scan (through the angle φ) in the first spatial direction and a comparatively slow scan (through the angle θ) in the second spatial direction which was described above and brought about by the dispersive scanning device 130 operating in two dimensions according to the invention has gaps in the scanning region as a consequence as a matter of principle, said gaps corresponding to "not scanned" angular regions. These circumstances can be taken into account by virtue of the fact that, in embodiments of the invention and as indicated in the diagram of FIG. 3, an effective displacement of the scanning pattern is brought about by successive displacements of the respective "start wavelength" in the case of successive scans while the working frequency of the AWG 131 of the dispersive scanning device 130 is displaced at the same time in order to fill up the aforementioned gaps or angular regions not scanned. To facilitate this successive wavelength displacement, the tuning range of the laser array 111 is preferably chosen to be, e.g., at least 10% greater than the minimum tuning range required to cover the desired scanning angle region with the dispersive scanning device 130.

Further, with reference to FIG. 5ff, embodiments of the invention are described, in which the optical signals which are usable for obtaining additional information in respect of the relative speed between the object and the measuring apparatus and which have temporally opposite frequency profiles are generated by way of separate lasers, with the consequence that, in conjunction with a suitably configured dispersive scanning device and an appropriate synchronous operation of the two lasers, a significant measurement time reduction (substantially by a factor of two) can be achieved.

Figure 5A:
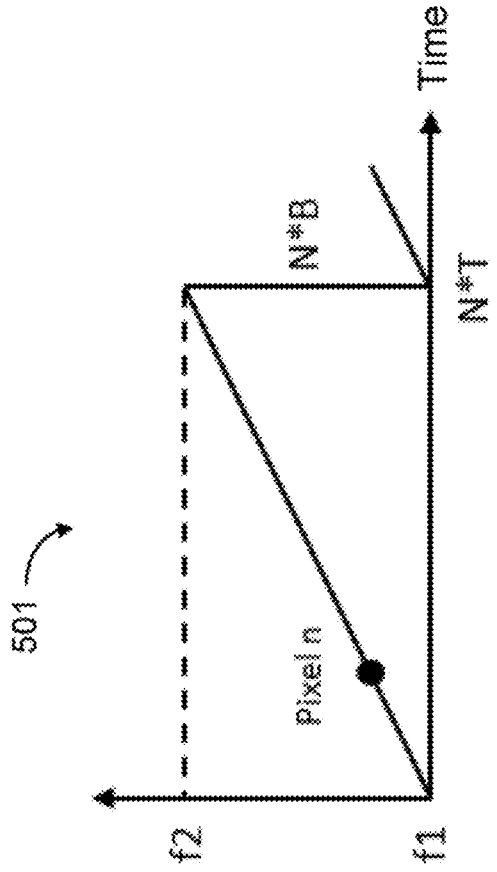
Figure 5B:
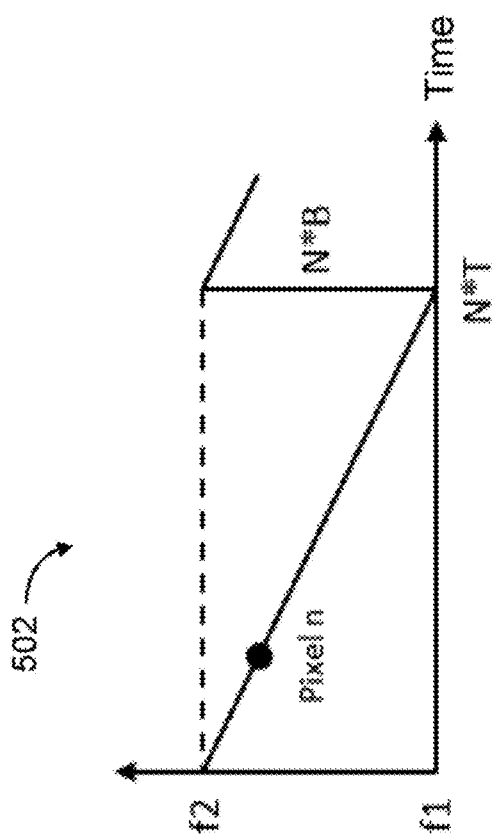
Figure 5C:
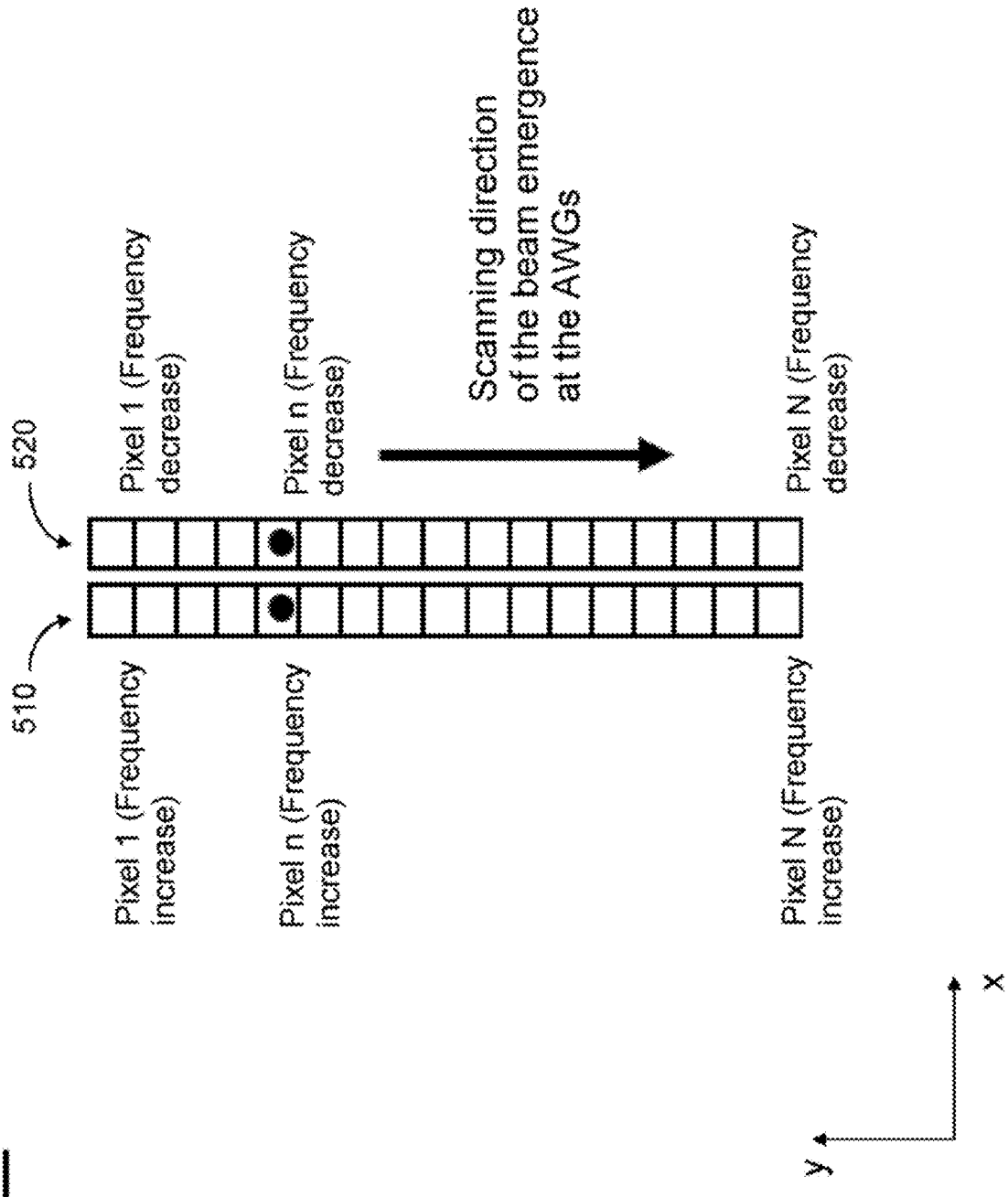

According to the embodiment of FIGS. 5a-5c, the light source unit comprises two tunable lasers with corresponding traversed frequency ranges (="tuning ranges") 501, 502. Here, in FIGS. 5a-5c, "B" denotes the tuning bandwidth per pixel, "N" denotes the number of pixels per pixel row, $N*B=f_2-f_1$ denotes the tuning bandwidth per pixel row, "T" denotes the tuning duration per pixel and "B/T" denotes the tuning rate.

For the first laser, the frequency is increased in accordance with the traversed frequency range 501 from the value $f_1$ to the value $f_2$ with a linear time dependence as per FIG. 5a, whereas, for the second laser, the frequency is reduced in accordance with the traversed frequency range 502 from the value $f_2$ to the value $f_1$ with a likewise linear but opposite time dependence. Here, the tuning rate (B/T) is chosen to be equal for both lasers in terms of absolute value but having opposite sign. In accordance with FIG. 5c, the measurement signal that emerged from the optical signal of the first laser is coupled into a first AWG 510, whereas the measurement signal that emerged from the optical signal of the second laser is coupled into a second AWG 520. Moreover, the second AWG 520 is arranged in a manner laterally reversed to the first AWG 510. Thus, when tuning both lasers, the respective beams or laser spots are guided over the object next to one another and in the same direction. It should be noted that the AWGs 510 and 520 of this exemplary embodiment have a free beam region behind the waveguides, and so these act like line spectrometers. In combination with an imaging optical unit, the beams emanating from the AWGs (large dots in FIG. 5c) simultaneously migrate over the object next to one another.

In accordance with FIG. 5c, the two AWGs 510, 520 are arranged in such a way that the measurement radiation of the first AWG 510 and the measurement radiation of the second AWG 520 are incident on the object with sufficient spatial proximity but with negligible overlap of the laser spots (which typically each have a Gaussian intensity distribution). In particular, the distance between the measurement radiation of the first AWG 510 and the measurement radiation of the second AWG 520 can range between one and ten beam diameters. In particular, the two AWGs 510, 520 can be produced in monolithic fashion (without however the invention being restricted thereto).

Since the laser spots of the first and the second laser, each with a Gaussian intensity distribution, do not overlap in the exemplary embodiment of FIGS. 5a-5c, the radiation of both lasers can be separated again within the scope of the detection and can be supplied to two independent, balanced detectors. The distance and speed of the object can be calculated on the basis of the sum and the difference of the beat frequencies ascertained using the detectors.

Figure 6A:
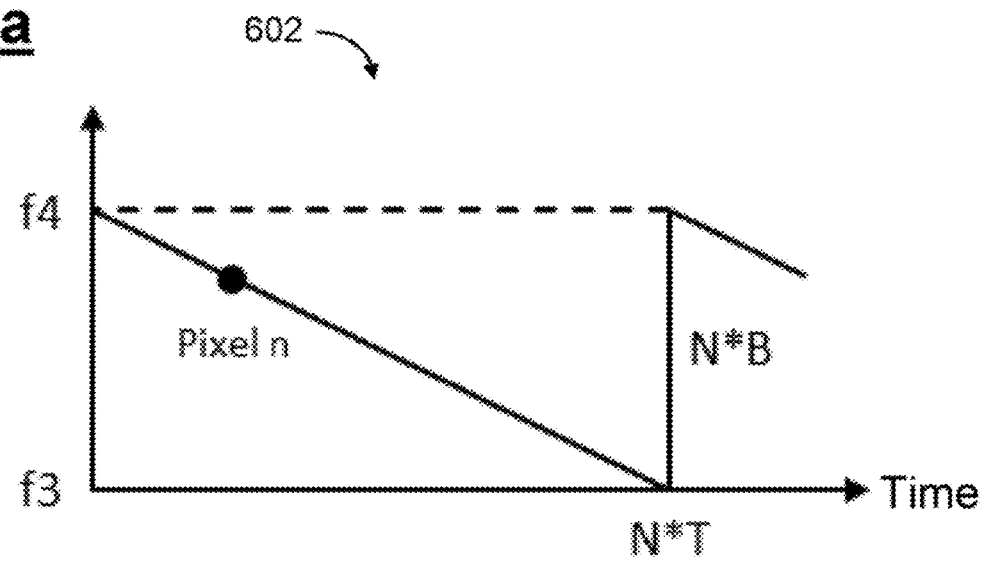
Figure 6B:
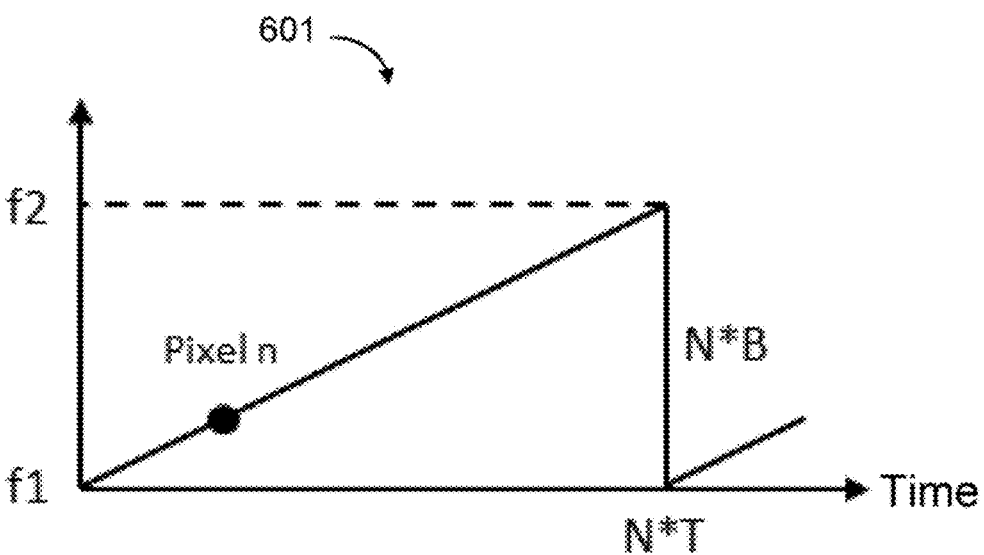
Figure 6C:
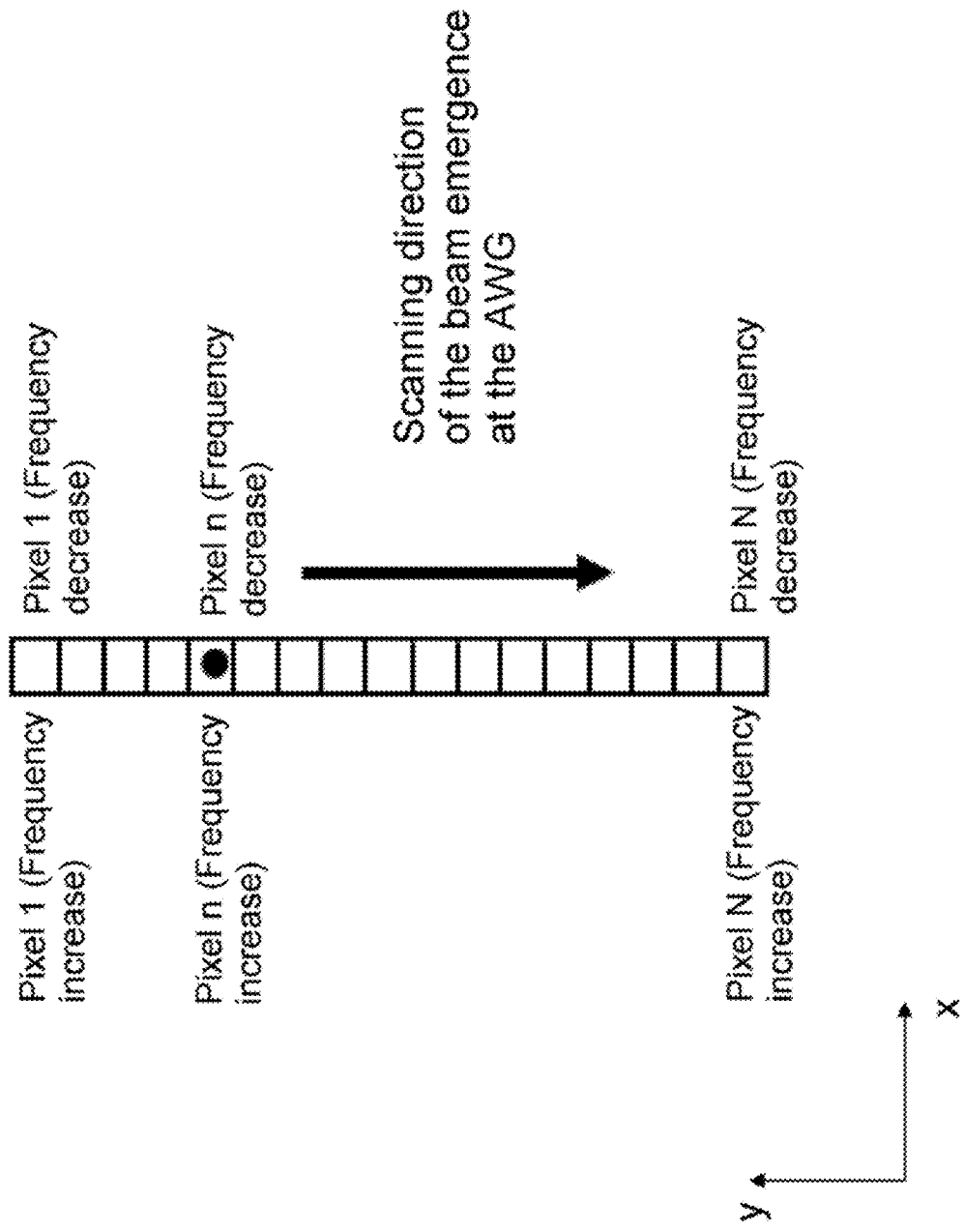

In a further embodiment in accordance with FIGS. 6a-6c, the light source unit has two tunable lasers with different frequency ranges $[f_1 \ldots f_2]$ and $[f_3 \ldots f_4]$ (where $f_1<f_2<f_3<f_4$ applies). In the case of the first laser, the frequency is increased in accordance with the traversed frequency range 601 from the value $f_1$ to the value $f_2$ with a linear time dependence as per FIG. 6b, whereas, for the second laser, the frequency is reduced in accordance with the traversed frequency range 602 from the value $f_4$ to the value $f_3$ with a likewise linear but opposite time dependence as per FIG. 6a. Here, too, the tuning rate (B/T) is chosen to be equal for both lasers in terms of absolute value but having opposite sign. The optical signals of both lasers are superposed and, in accordance with FIG. 6c, coupled into a single AWG 610 (or one AWG per pixel row). The frequencies $f_1$ and $f_3$ are spaced apart by an integer multiple of the free spectral range (FSR) of this AWG 610. Here, the two lasers use different AWG orders, with the circumstances that the laser radiation generated by the lasers is periodically assigned with the spacing of the free spectral range (FSR) to the same AWG output channels being exploited. The radiation of both lasers consequently emerges from one and the same AWG location or pixel at all times.

The two laser spots (typically each having a Gaussian intensity distribution) have complete spatial overlap at the object. However, on account of the non-overlapping frequency regions, the radiation from both lasers can be spectrally separated again during the detection and can be supplied to two mutually independent balanced FMCW detectors. The distance and speed of the object can be calculated from the sum and the difference of the beat frequencies ascertained using the detectors.

As explained below with reference to FIGS. 7a-7b, it is also possible to measure a plurality of pixel rows in parallel if, while realizing a larger field of view, use is made of a stacked arrangement of (a total of M) AWGs or AWG pairs (in a manner analogous to FIG. 5c or FIG. 6c). The plurality of spatially separated output channels generated by the dispersive effect of these AWGs on account of the frequency-selective distribution of the measurement signals can be imaged by way of an imaging system on the object to be measured in terms of its distance. The image can also be at infinity such that a largely collimated measurement beam is emitted for each AWG output channel. In view of the sought-after high spatial resolution with a large field of view (FOV), a value for M that is as high as possible can be chosen although a smaller value of M (e.g., M=2) can be chosen under manufacturing aspects or for reasons of cost. As a consequence of the stacked arrangement of the AWGs indicated in FIG. 7b, a matrix-like arrangement of M*N output channels arises in the exemplary embodiment, with the individual groups of N output channels respectively belonging to an AWG being denoted by "710a", "710b", "710c", . . . in FIG. 7b.

In a greatly simplified schematic illustration, the view of FIG. 7a shows the structure of an individual AWG, which is supplied with electromagnetic radiation with a time-varying frequency from a light source (not illustrated in FIGS. 7a-7b) via an input light guide 701. The radiation enters the AWG waveguides 703 of different lengths via a first free beam region 702 and constructively interferes at different locations at the end of a second free beam region 704 on account of the different phase retardations caused in the waveguides 703. A multiplicity N of output channels (where N may be at least 10 or at least 100, for example) is therefore provided at the output in accordance with the spectral resolution of the AWG.

Figure 7C:
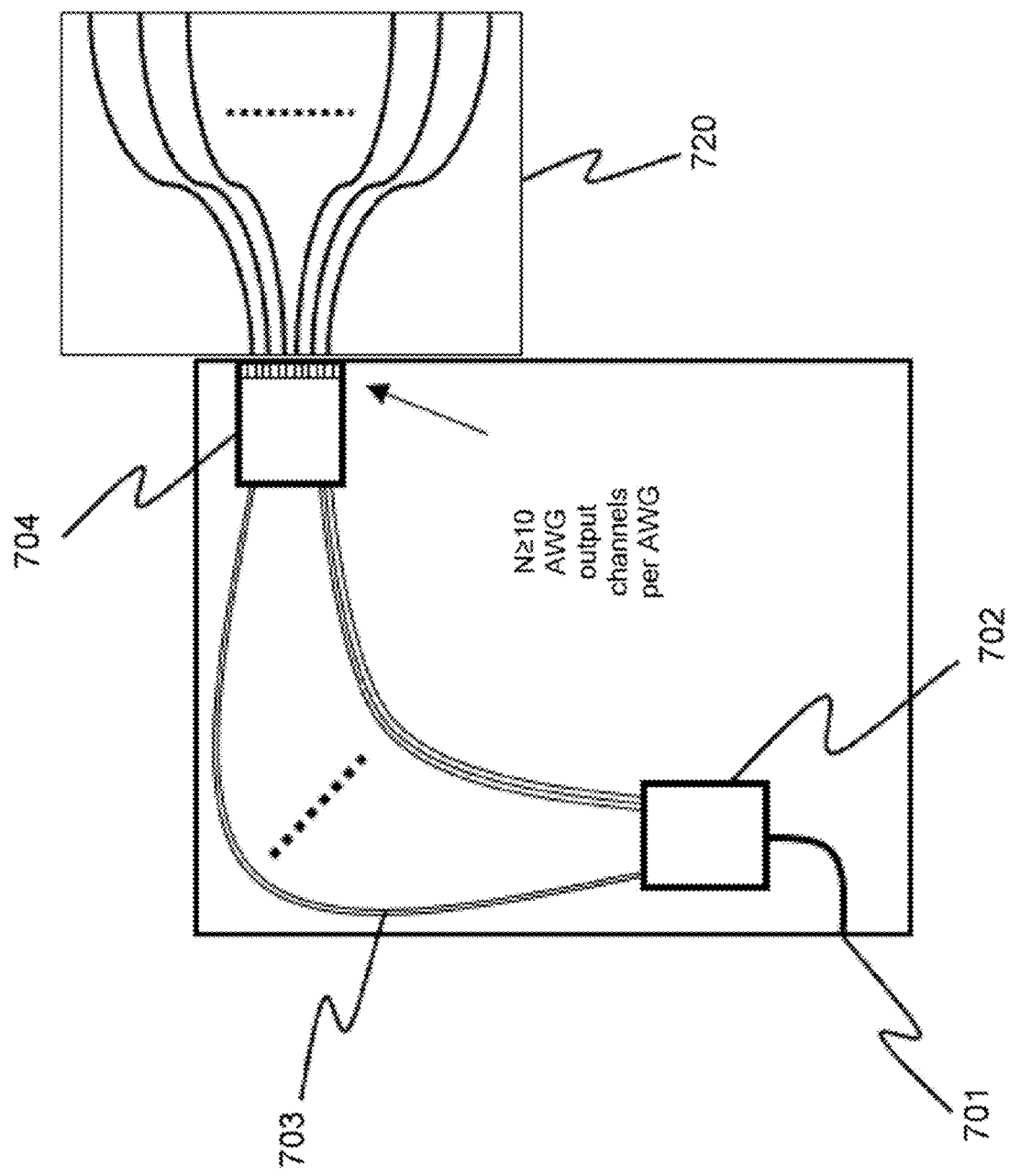

In accordance with FIG. 7c, the distance between the output channels generated by an AWG in each case can be increased by way of an additional spreading element prior to the projection thereof onto the object via an imaging system. Such a spreading element 720 can have a stack of N planar individual elements for channel spreading, with the light guides of the spreading element 720 being optically coupled to the output channels of the AWG arrangement. Preferably, an element for channel spreading is directly assigned to each individual AWG in a monolithic production method. The use of the spreading element 720 firstly facilitates the coverage of a larger solid angle range and secondly also facilitates the reduction in the angular speed of the measurement beam on the object during the individual distance measurements, as a result of which, in turn, phase fluctuations can be reduced and the obtainable depth resolution can be increased or peak widths in the measured distance spectrum can be reduced.

In addition to the aforementioned AWG arrangement and the aforementioned imaging system, the apparatus can also comprise at least one deflection element, by means of which the respective angle at which light is steered to the object by the AWGs of the AWG arrangement is variable in order to bridge a remaining spatial distance between the individual AWGs of the AWG arrangement during the optical imaging of the output channels on the object without restricting the field of view (FOV), which can be, e.g., 20° *20°. Thus, the deflection element serves to increase the angular resolution. The deflection element can be a mechanically movable optical element, wherein use can be made both of reflective elements (e.g., a mirror that is adjustable by at least one flexure bearing) and refractive optical elements (e.g., lenses or prisms). Furthermore, optical phase arrays (OPAs), for example in the form of liquid crystal polarization gratings (LCPG=Liquid Crystal Polarization Gratings), can also be used as deflection elements.

Figure 8A:
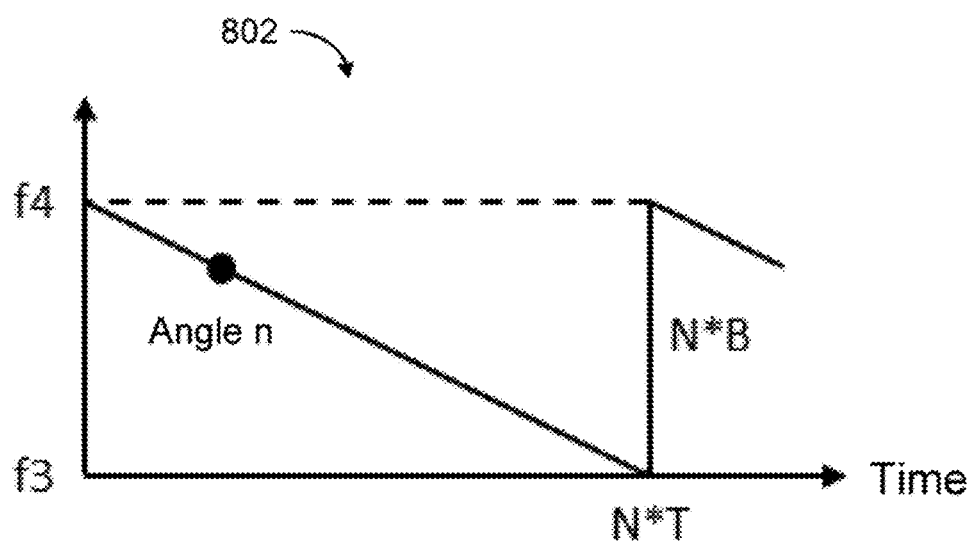
Figure 8B:
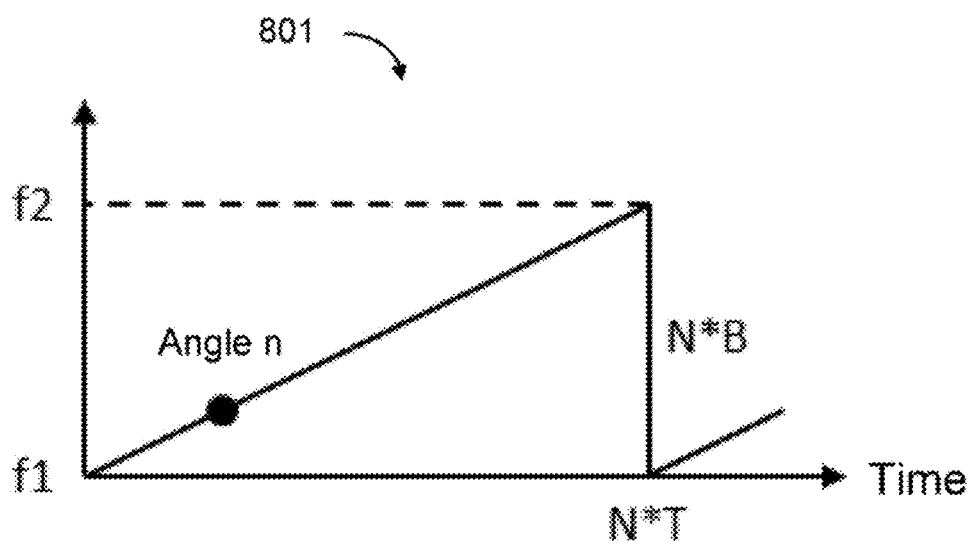
Figure 8C:
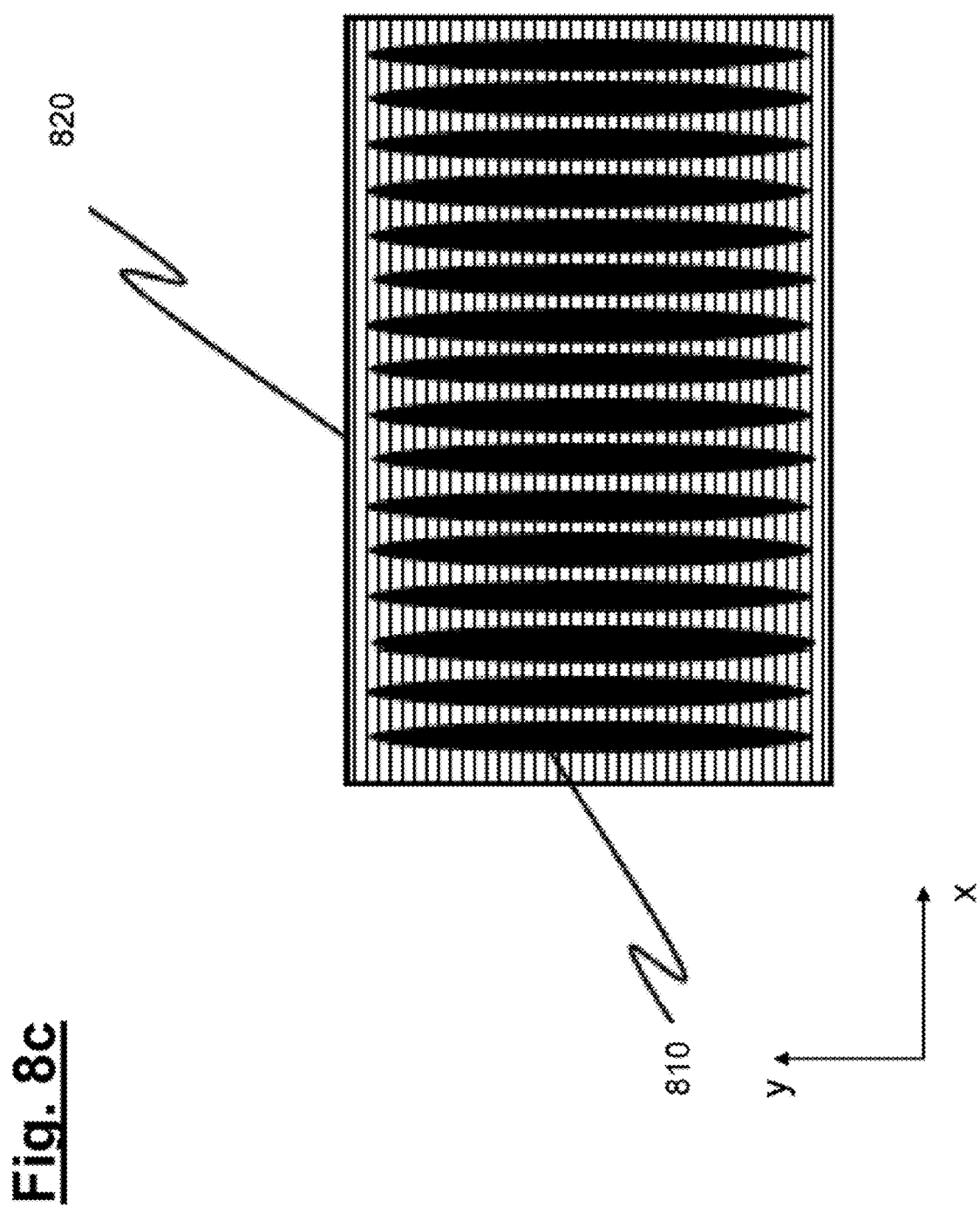

In accordance with a further embodiment of FIGS. 8a-8c, the light source unit once again comprises two tunable lasers with, in accordance with FIGS. 8a-8b, different frequency ranges 801, 802 (regions $[f_1 \ldots f_2]$ and $[f_3 \ldots f_4]$, respectively, with $f_1 < f_2 < f_3 < f_4$). In the case of the first laser, the frequency is increased in accordance with the traversed frequency range 801 from the value $f_1$ to the value $f_2$ with a linear time dependence as per FIG. 8b, whereas, for the second laser, the frequency is reduced from the value $f_4$ to the value $f_3$ with a likewise linear but opposite time dependence as per FIG. 8a. Here, the tuning rate (B/T) is chosen to be equal for both lasers in terms of absolute value but having opposite sign. The optical signals of both lasers are superposed and, in accordance with FIG. 8c, shaped into a laser line 810 using an anamorphic optical unit, e.g., a cylindrical optical unit, and coupled into a diffraction grating 820. A vertical pixel row is generated during spectral tuning by way of the laser line 810 shaped by the cylindrical optical unit. The frequencies $f_1$ and $f_3$ are spaced apart by an integer multiple of the free spectral range (FSR) of the diffraction grating 820, and so the radiation of both lasers is deflected through the same grating deflection angle at all times. In the process, the two lasers use different diffraction grating orders. The two laser spots (typically each having a Gaussian intensity distribution) have complete spatial overlap at the object to be measured. However, on account of the non-overlapping frequency regions, the radiation from both lasers can be spectrally separated again during the detection and can be supplied to two mutually independent balanced detectors. Here, too, a plurality of pixel rows can be measured in parallel in a manner analogous to FIGS. 7a-b by virtue of a plurality of parallel laser lines 810 being shaped by the cylindrical optical unit and being coupled into the diffraction grating 820 next to one another.

Preferably (but without the invention restricted thereto), as many parts of the apparatus according to the invention as possible are implemented in the form of PICs ("photonic integrated circuit").

Even though the invention has been described on the basis of specific embodiments, numerous variations and alternative embodiments will be apparent to a person skilled in the art, for example through combination and/or exchange of features of individual embodiments. Accordingly, it goes without saying for the person skilled in the art that such variations and alternative embodiments are concomitantly encompassed by the present invention, and the scope of the invention is restricted only within the meaning of the appended patent claims and the equivalents thereof.

The invention claimed is:

1. An apparatus for scanning ascertainment of a distance to an object, wherein the apparatus comprises:

a light source unit comprising a plurality of lasers, wherein each laser is configured to emit an optical signal having a time-varying frequency, wherein, at a given time, the frequencies of the optical signals emitted by the plurality of lasers are different;

a first dispersive element configured to simultaneously receive, from the plurality of lasers, the optical signals having different frequencies and to cause a frequency-dependent deflection of the optical signals;

a second dispersive element distinct from the first dispersive element and configured to spatially split measurement optical signals, which have been reflected or scattered at the object and passed the first dispersive element, in a frequency-dependent manner;

a plurality of detector elements receiving the measurement optical signals that were split by the second dispersive element, wherein each detector element is configured to generate a detector signal that represents a difference frequency between a frequency of the detected optical signal and a frequency of a reference optical signal that was emitted by the light source unit and was not reflected or scattered at the object; and an evaluation device configured to ascertain the distance to the object on the basis of the detector signals.

2. The apparatus of claim 1, wherein at least one of the plurality of lasers is selected from the group consisting of: a DFB laser, a DBR laser, an FDML laser, a WGMR laser, a surface-emitting laser.

3. The apparatus of claim 1, wherein the frequencies of the optical signals emitted by the plurality of lasers vary in time between a lower frequency and a higher frequency, and wherein the lower frequency and the higher frequency associated with each of the plurality of lasers are different.

4. The apparatus of claim 3, wherein an overall tuning range defined as a difference between the lowest frequency and the highest frequency occurring in the plurality of lasers is between 1 THz and 10 THz.

5. The apparatus of claim 1, wherein the optical signals emitted by the plurality of lasers each have a time-dependent frequency profile comprising a first section and a second section, wherein a time derivative of the frequency in the first section is opposite to a time derivative of the frequency in the second section.

6. The apparatus of claim 1, wherein the plurality of lasers comprises a first laser, which is configured to emit a first optical signal having a first time-dependent frequency profile, and a second laser, which is configured to emit a second optical signal having a second time-dependent frequency profile, wherein time derivatives of the frequencies in the first frequency profile and the second frequency profile are different from one another.

7. The apparatus of claim 6, wherein the time derivatives of the frequencies in the first frequency profile and the second frequency profile are opposite to one another.

8. The apparatus of claim 6, wherein the first frequency profile has a first frequency range and the second frequency profile has a second frequency range that differs from the first frequency range.

9. The apparatus of claim 1, wherein the first dispersive element comprises at least one diffraction grating that is configured to receive the measurement optical signals.

10. The apparatus of claim 1, wherein the first dispersive element is configured to cause a frequency-dependent deflection in two mutually perpendicular directions.

11. The apparatus of claim 1, wherein the first dispersive element comprises an arrayed waveguide and a diffraction grating.

12. The apparatus of claim 1, wherein different detector elements are assigned to different angular regions in an angular deflection distribution caused by the first dispersive element.

* * * * *